Figure 1:
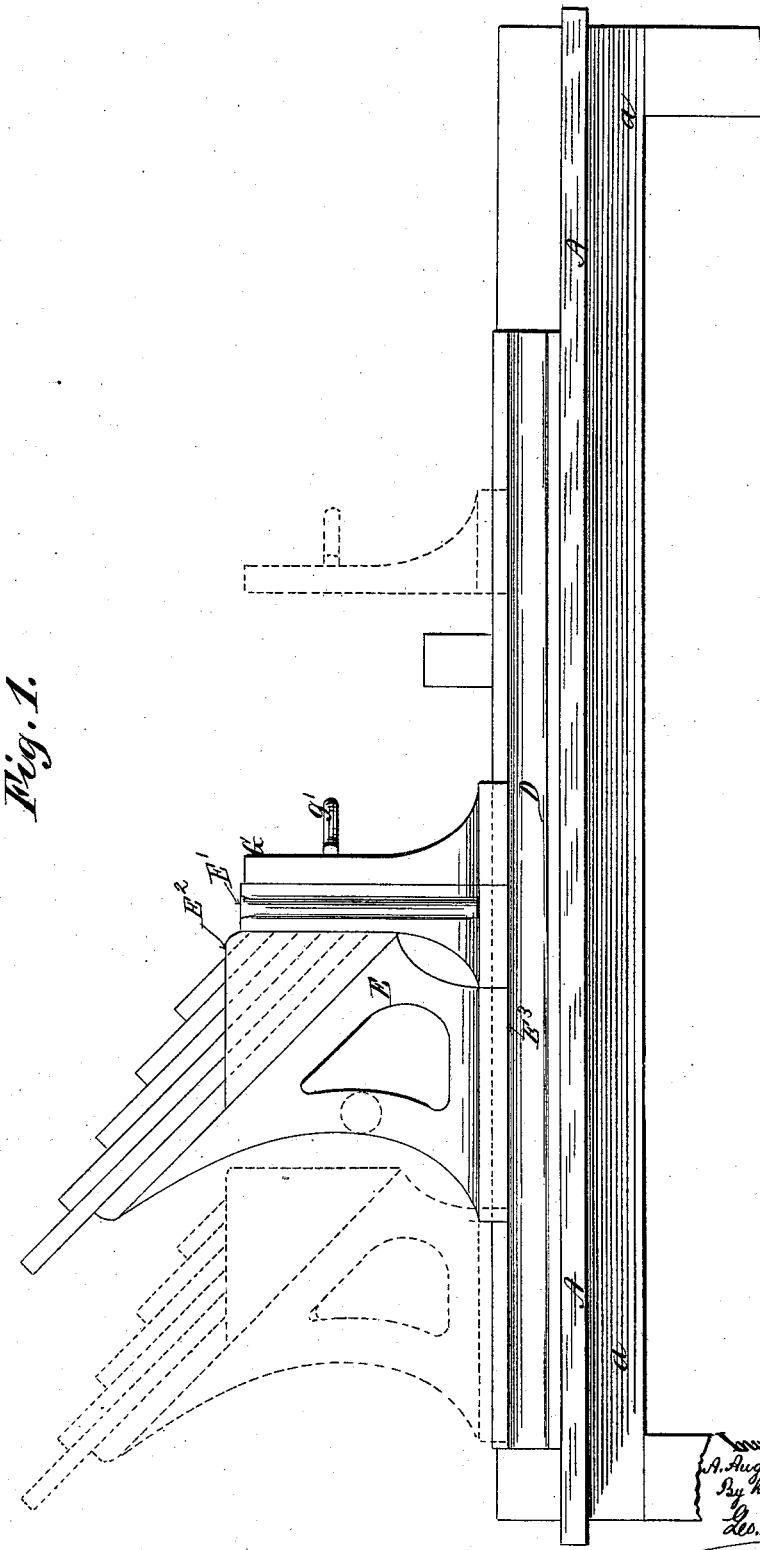

(No Model.) 6 Sheets—Sheet 1.

A. A. LOW.
TYPE DISTRIBUTING APPARATUS.

No. 372,076. Patented Oct. 25, 1887.

(No Model.) 6 Sheets—Sheet 2.

A. A. LOW.
TYPE DISTRIBUTING APPARATUS.

No. 372,076. Patented Oct. 25, 1887.

(No Model.) 6 Sheets—Sheet 3.
A. A. LOW.
TYPE DISTRIBUTING APPARATUS.
No. 372,076. Patented Oct. 25, 1887.
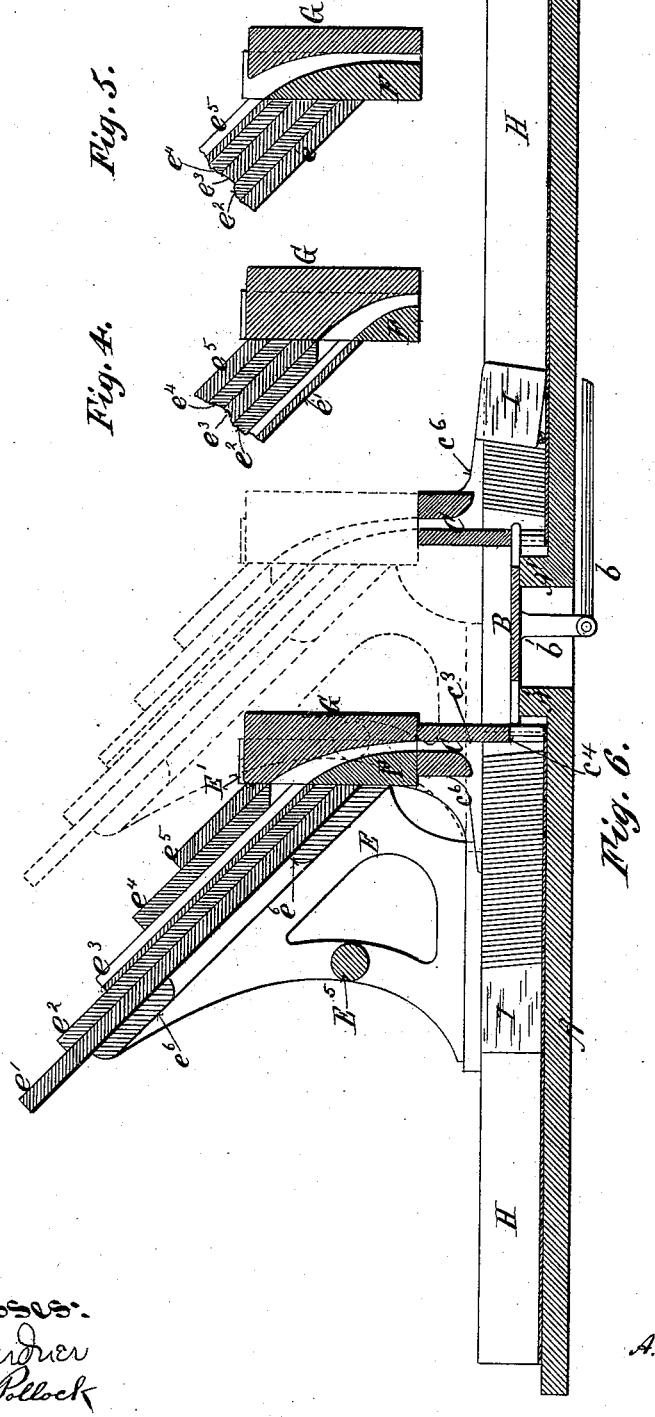
Witnesses:
Wm. Gardner
Wm. A. Pollock
Inventor:
A. Augustus Low,
By his Attorney,
Geo. H. Miatt (No Model.)  6 Sheets—Sheet 4.
A. A. LOW.
TYPE DISTRIBUTING APPARATUS.
No. 372,076.  Patented Oct. 25, 1887.
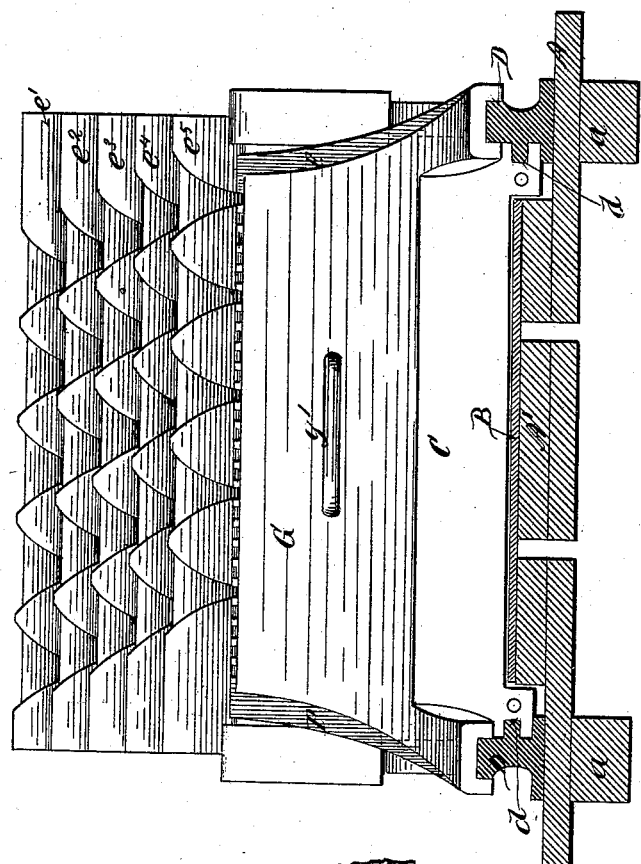
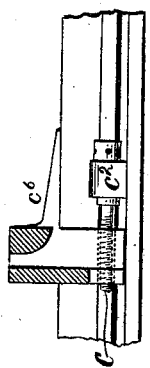

(No Model.) 6 Sheets—Sheet 5.
A. A. LOW.
TYPE DISTRIBUTING APPARATUS.
No. 372,076. Patented Oct. 25, 1887.
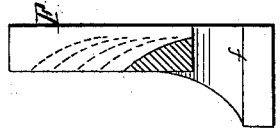
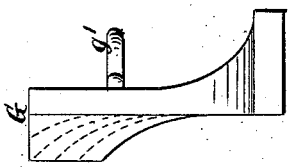
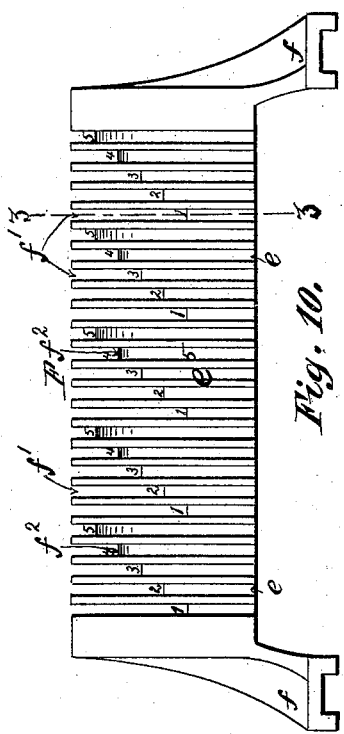
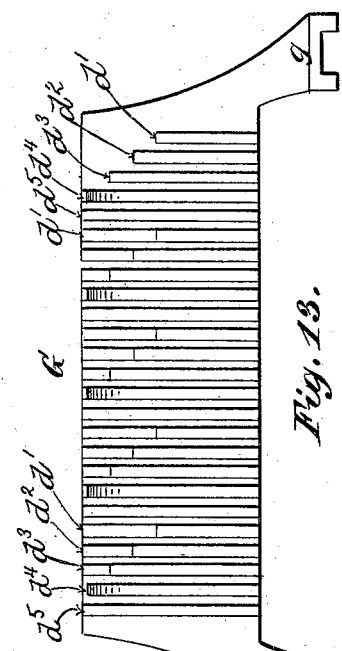
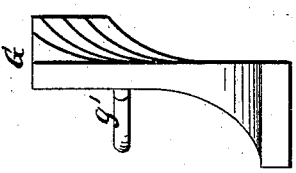
Witnesses:
Wm Gardner
Wm A Pollock
Inventor.
A. Augustus Low,
By his attorney
Geo. H. Mott (No Model.)  6 Sheets—Sheet 6.

A. A. LOW.
TYPE DISTRIBUTING APPARATUS.

No. 372,076.  Patented Oct. 25, 1887.

Witnesses:
Wm Gardner
Wm A. Pollock

Inventor:
A. Augustus Low
By his Attorney
Leo. W. Mall

UNITED STATES PATENT OFFICE.

A. AUGUSTUS LOW, OF BROOKLYN, NEW YORK.

TYPE-DISTRIBUTING APPARATUS.

SPECIFICATION forming part of Letters Patent No. 372,076, dated October 25, 1887.

Application filed September 13, 1886. Serial No. 213,437. (No model.)

*To all whom it may concern:*

Be it known that I, A. AUGUSTUS LOW, a citizen of the United States, residing in the city of Brooklyn, in the county of Kings and State of New York, have invented certain new and useful Improvements in Type-Distributing Apparatus, of which the following is a full, clear, and exact description, sufficient to enable others skilled in the art to which it appertains to make and use the same.

My invention relates to the method and mechanism for distributing type by hand, as set forth in the several patents and applications therefor, originated by Louis K. Johnson and myself, among which reference may be had to Patents Nos. 264,085, 282,988, 337,406, 340,124, and recent applications; and my present improvements relate more especially to the form of apparatus set forth in our last application, No. 207,020, in which a single series of type-receiving plates, conduits, &c., is adapted to the distribution of the types upon both sides of our duplex type-bank or double set of type-containing channels.

In the last application referred to, the receiving-plates, the intermediate or face plate, and its cover or shield are all mounted upon the same carriage and move together therewith. While such construction is convenient and effective in use, I design to still further simplify and perfect the construction, so as to facilitate access to all portions of the type-passages and render the parts more free and independent in their relations to each other without affecting their perfect alignment or coincidence. I therefore in my present construction mount the receiving-plates, the intermediate or face plate, and the cover or type-controlling plate independently upon the parallel rails or ways in such manner that all three plates can be quickly and entirely separated, one from the other, at any time, in order to give access to the type-passages or the parts below, or they may be as quickly reunited, while the united plates may be collectively and simultaneously slid over or transferred into position for feeding into either set of type-containing channels. Practically this feature of the perfect freedom and independence of the parts for receiving, directing, and controlling the types is of great importance, since it enables me to instantly remedy any obstruction or defect in the descent of the types, owing to the ease and rapidity with which the several plates may be spread apart or reunited. I am also enabled to effect a more rigid and durable construction than heretofore, while cheapening and simplifying the construction of the apparatus as a whole. All the movable parts, both the receiving-plates and their carriage and the intermediate or face plate and its cover or type-controlling plate are held in position by gravity alone, so that they may be readily removed bodily from position, if desired, when placing the type-containing channels upon the bed of the apparatus underneath, or for other reasons, and be as readily replaced without the unfastening or fastening of parts of any kind.

In my present construction the type-receiving plates are perfectly flat and the grooves therein are consequently straight, the curvature in the type-passages being confined entirely to the intermediate or face plate, which is made thick enough for this purpose—that is to say, the floors of the type-grooves in the face-plate from their point of juncture with the lower ends of the floors of the type-passages in the receiving-plates curve downward gradually until they are vertical.

A leading feature of my invention in this connection consists in forming the ribs upon the cover-plate with concave surfaces, which are opposed to convex type floors upon the intermediate or face plate in such manner as to control the descent of the types thereon, the inclosed type-passages thus formed being wider at their upper extremities and gradually converging into narrow vertical passages, which coincide in area with the vertical type-passages in the stationary type-conduits underneath. The concave type-controlling surfaces control the descent of the types in such manner as to obviate all looseness or play, while allowing the types to conform naturally to the changes in inclination imparted by their descent over the convex surfaces in the intermediate or face plate.

I am aware that in our Patent No. 340,124, dated April 20, 1886, similar concave type-controlling surfaces are shown and described, and I do not herein seek to cover such construction, broadly, but limit myself to the special construction and combination of parts herein designated. For instance, in the patent referred to the concave type-controlling surfaces form an attachment to an inclined type-conduit, upon which they are adjustable with relation to the lower extremities of the type-receiving plates, whereas in my present construction the concave type-controlling surfaces project from an independently-supported horizontally-sliding plate and engage with grooves in an independent intermediate face-plate entirely distinct from, but common to, the series of receiving-plates. In the present case, also, the concave type-controlling curves upon the horizontally-moving cover-plates are not nearly parallel with the convex curves in the face-plate, but the two opposed curved surfaces are so proportioned with relation to each other that comparatively wide entrances are formed for the reception of the types when the said intermediate face-plate and its cover-plate are brought together into position over the stationary vertical conduits below.

The stationary vertical conduit-plates, with either of which the movable type receiving and conducting parts above referred to are made to communicate, and which deposit the types directly into the receiving ends of the type-receiving channels immediately underneath, are substantially the same in general position and operation as those shown and described in our said application, No. 207,020, before referred to, except that several important additions and improvements have been added thereto. In the first place, I make these so-called "stationary vertical conduits" adjustable slightly with relation to the position and motion of the type pusher or forwarder, and thereby attain an entirely novel and advantageous means of varying or regulating the effective stroke in either or both of the series of type-receiving channels. I am thus enabled to use a pusher void of adjustment, which has a prescribed uniform stroke, and still attain a more delicate degree of adjustment of the extent of action of the pusher upon the types than has heretofore been possible by the adjustment of the pusher itself for this purpose.

It is obvious that any adjustment of the pusher with relation to one series of type-receiving conduits is bound to interfere with its relation to the other series of type-containing channels also, so that an average adjustment for both only could be attained; but by my improvement I obviate this difficulty and render the adjustment independent for both sides of type conduits, so that it is possible to have either the same degree of effective stroke or a different degree of effective stroke on either side, as may be required by the size or character of the different types. I accomplish this by making each vertical conduit plate or bridge independently adjustable horizontally upon the apparatus with relation to the mean position of the vibratory pusher, it being understood that the latter has a prescribed motion and position between the two said stationary vertical conduit plates or bridges. Thus, for instance, by adjusting either one of the plates toward the position of the pusher the pusher-fingers upon the latter will protrude farther into that particular vertical conduit and forward the types in the containing-channels upon that side farther beyond the vertical type-passages than would be the case were the adjustment in the opposite direction, the position of the receiving ends of the type-containing channels being governed by that of the said vertical conduit-bridges, as will be hereinafter set forth.

Delicacy of adjustment of the action or stroke of the pusher upon the types is of importance, in view of the variations in size and weight between different sizes of types, and though, as before stated, provision has heretofore been made for adjusting the pusher bodily, as in Patent No. 337,406, and also for independently adjusting the combs or pusher-teeth upon opposite sides, as in the application No. 144,776, still even in the latter no conveniently effective or sufficiently delicate adjustment has heretofore been attained.

In this connection my invention also includes the special construction of the said stationary vertical conduits with type-channel shoulders, against which the ends of the type-channels are made to abut in use, so as to gage and maintain the proper relative arrangement of parts irrespective of the adjustment imparted to the conduits, the type-containing channels being simply slid forward in position until their inner or receiving ends encounter and are stopped by the said exterior shoulders.

Another important feature of my invention consists in extending the floors or type guiding surfaces of the type-conduits down to the floors or bottoms of the channels, so as to form a continuous unbroken support for the types until they are fully in position within the channels. In order to do this, comparatively narrow pusher-fingers are used of considerable less width horizontally than that of the smallest type to be distributed, and the difference between the width of a pusher-finger and that of a channel regulates the width of such type guides or shoulders, which extend downward upon either side of the pusher-fingers and also act as interior holders or centralizers for the type-containing channels themselves.

Heretofore the types have had to "jump" the space below the position of the type-pusher, between it and the floor or spine of the channel. In other words, they have been unsupported at that point, and have been therefore liable to slight derangement or change in position, which my improved construction renders impossible from such cause. Especially in the case of the smaller and more delicate types is it desirable to support and control the types positively, as far as possible, throughout and to the end of their passage, and since if the types are landed squarely and evenly upon their heels in the receiving ends of the channels a very thin but central pusher-finger is sufficient to raise and forward them safely, the utilization of the augmented space upon either size of the pusher-finger is a decided and important gain toward "positive control" under all conditions.

Another feature of my invention consists in forming the vertical conduits with lateral projections, which extend longitudinally over and form continuations of the side walls of the type-containing channels, for the double purpose of holding the latter firmly against vertical displacement and jar and of constituting with the side walls of the channels an unbroken surface extending some distance beyond the vertical conduits and gradually merging into the upper edges of the channel-walls.

I do not wish to confine myself to the identical form or construction shown in the accompanying drawings, which are designed to represent a practicable means of utilizing my improvements, while certain details may be modified or dispensed with without deviating from the spirit of my invention. The character and requisites of apparatus of this class are so well set forth in previous patents and applications that I have not deemed it necessary herein to show the full number of receivers, channels, &c., ordinarily embodied in a single apparatus, and I have also omitted parts that are not essential to the illustration of my invention.

Figure 2:
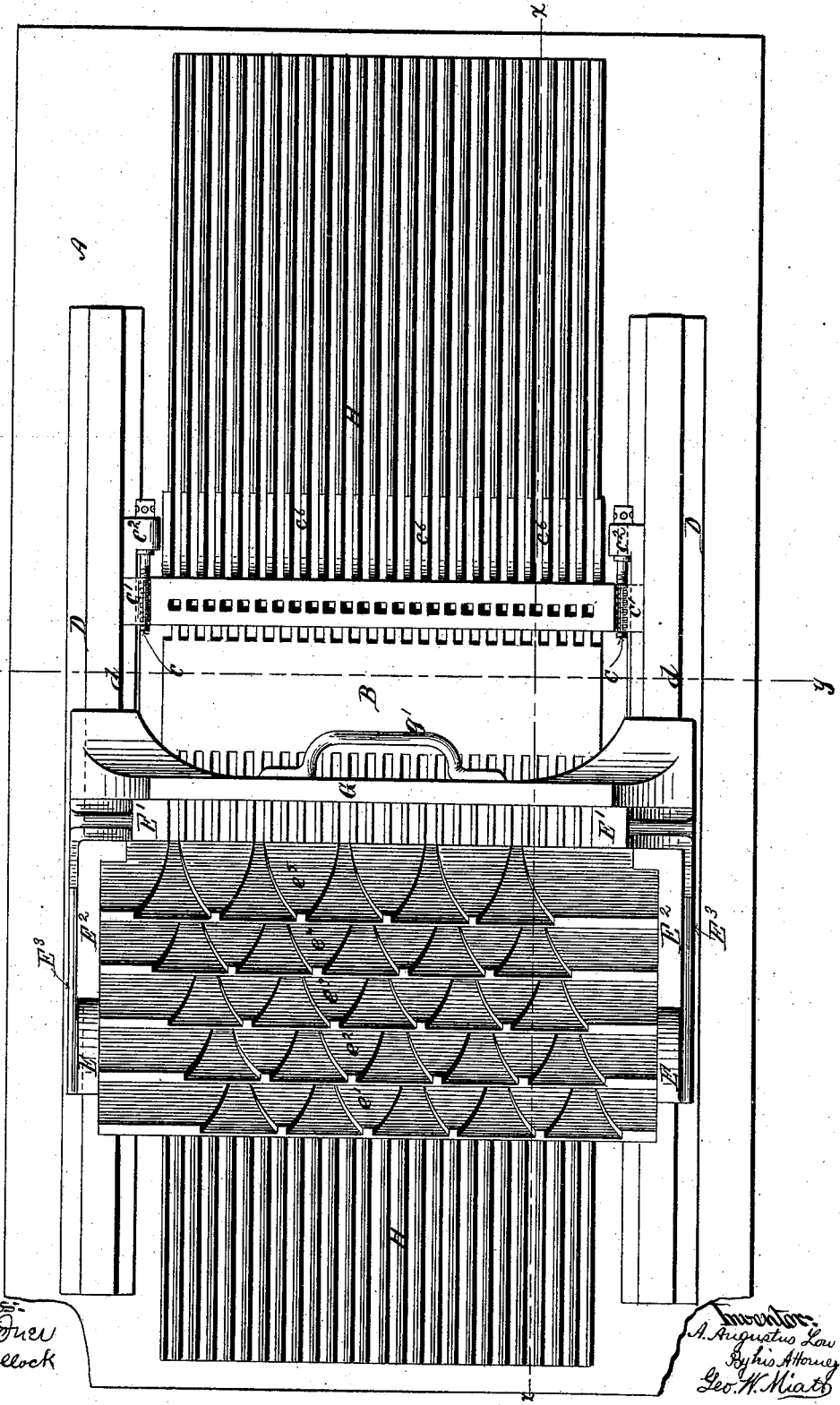
Figure 15:
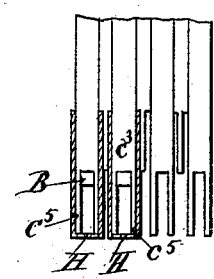
Figure 17:
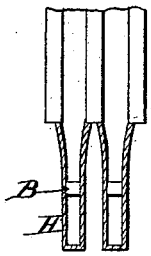
Figure 16:
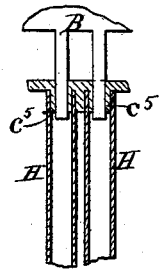

Figure 1 is a front elevation of my improved construction of apparatus, the receiver-plates and the cover-plate being shown as withdrawn from the intermediate or face plate in dotted lines. Fig. 2 is a plan of the apparatus with the parts in position for distribution into the left-hand series of type-containing channels. Fig. 3 is a vertical longitudinal section upon plane of line $x$ $x$, Fig. 2, showing the type receiving and conducting passages in communication with the left-hand series of type-containing channels and by dotted lines representing the same parts forwarded to coincide with the right-hand series of type-conduits. Fig. 4 is a sectional detail through adjoining portions of the receiving-plates, face or intermediate plate, and its cover or shield, taken upon a vertical plane passing longitudinally through one of the lowest type-passages. Fig. 5 is a similar view taken upon a vertical plane passing longitudinally through one of the highest type-passages. Fig. 6 is a front elevation of one of the stationary conduit pieces or bridges detached. Fig. 7 is a vertical transverse section upon plane of line $y$ $y$, Fig. 2, looking toward the left-hand side of the apparatus. Fig. 8 is a sectional view through one of the stationary vertical conduit pieces or bridges, illustrating means of effecting the adjustment of the said bridges when mounted upon and between the longitudinal parallel rails or ways upon the bed of the apparatus. Fig. 9 is a plan view of a portion of one of the longitudinal rails or ways and the extremities of both vertical conduit pieces or bridges supported thereon in such manner as to provide for their horizontal adjustment. Fig. 10 is a front elevation of the intermediate or face plate detached. Fig. 11 is a vertical section of the same upon plane of line $z$ $z$, Fig. 10, through one of the lowest type-surfaces, and showing the relative positions of the other type-surfaces by dotted lines. Fig. 12 is an end elevation of one extremity of the cover or shield-plate detached. Fig. 13 is an elevation of the inner or ribbed side of the same, and Fig. 14 an elevation of the other extremity of the said plate. Fig. 15 is a detail vertical elevation, upon an enlarged scale, illustrating the extension of the vertical type-surfaces down to the floors of the type-containing channels upon either side of the pusher-teeth. Fig. 16 is a horizontal section of the same, taken upon a plane just above the upper side of the pusher-teeth. Fig. 17 is a vertical sectional elevation, in detail, illustrating the use of type-containing channels of smaller width than the maximum, and Fig. 18 a horizontal sectional view of the same similar to Fig. 16.

The table or bed of the apparatus is horizontal, or nearly so, and is supported upon any usual or desired form of frame-work, $a$ $a$. In practice I design to combine and arrange two complete duplex cases upon each table or frame, so that an operator can be situated upon either side of the table, as set forth in Patent No. 340,124 and in subsequent applications for patent made by Louis K. Johnson and myself; but in the drawings only a single case or system is shown.

The type forwarding or pushing mechanism B is situated at or near the center of the table A, extending across it transversely.

Any suitable or special form of reciprocating type-pusher or forwarding mechanism may be used, as may be deemed preferable, that shown in the drawings consisting of the double comb plate B, which rests upon a suitable elevated bed or support, A', and is reciprocated by connecting-rods $b$ $b$, attached at one end to the downwardly-projecting lugs $b'$ $b'$ and at the other to any suitable form of eccentrics or cranks situated upon a driving-shaft and adapted to impart a prescribed degree of reciprocal motion to the parts. The pusher B thus has a prescribed uniform motion and mean position, the stroke or degree of protrusion of the pusher-fingers being equal upon either side.

In application No. 207,020 two low stationary vertical conduits are shown, one upon each side of the pusher. I employ similar vertical type-conduits, C C, which are nominally stationary in use, but which, for the purpose of effecting an adjustment of the effective stroke of the pusher-fingers when desirable, are mounted upon the apparatus in such manner that they may be adjusted horizontally toward or from the mean position of the pusher B.

It is obvious that the principle here involved is the adjustment of the vertical conduits with relation to the position and stroke of the pusher, and it is immaterial whether one or two vertical conduits are employed, (as the distributing apparatus is not necessarily duplex,) or what special means are employed for effecting the adjustment, the essential feature of construction being such that as the vertical conduit is advanced toward the pusher the pusher-fingers upon the latter will protrude within and beyond the vertical type-passage, while in direct proportion as the said vertical conduit is receded the effective stroke of the pusher-fingers will be lessened.

The vertical conduit plates or bridges C C may be mounted on any suitable longitudinal rails or ways upon stationary parts of the apparatus. In the drawings they are shown as mounted upon longitudinal tenons or shoulders $d$ $d$, which project laterally upon the inner sides of the main rails D D, upon the upper surface of which latter the movable receiver-carriage E, intermediate face-plate, F, and cover or shield G rest and slide.

By way of illustrating a means of effecting the adjustment of the vertical conduit-plates C C, set-screws $c$ $c$ are shown in the drawings, the threaded ends of which engage female screws formed in the lugs or feet $c'$ $c'$ of the bridges C C, while the other extremities of the screws rest in lugs or stationary bearings $c^2$ $c^2$, and are held against longitudinal movement by suitable flanges and heads, which latter are perforated or nicked to afford means for rotating the screws upon their longitudinal axes.

In Fig. 2 both extremities of the right-hand vertical conduit-bridge C are shown as provided with such means of horizontal adjustment, and the left-hand vertical conduit-bridge is in like manner provided with duplicate devices, excepting that in the latter case the adjusting-screws are arranged with their heads in the opposite direction, as will be understood by reference to Fig. 9.

In operation, when it is desired to increase or diminish the effective or operative stroke of the pusher-fingers on either side, the set-screws $c$ $c$ are rotated in the proper direction, causing the conduit-bridge C to move horizontally until the vertical type-guiding surface $c^3$ is brought into the desired position with relation to the actual stroke and position of the pusher.

In application No. 207,020 the vertical conduits are formed in two pieces, one of which is adjustable with relation to the other. In the present case I prefer to form them of a single piece suitably perforated with vertical type-passages, and formed at either extremity with the slotted lugs or feet $c'$ $c'$, which engage with the horizontal tenons or rails $d$ $d$, formed upon the inner sides of the main rails D D, or upon any other convenient stationary portion of the apparatus.

In order to preserve the proper relative arrangement of parts under all circumstances, the vertical conduits C are formed with the channel-back rests or stops $c^4$, against which the extreme edges of the receiving ends of the type-containing channels are designed to rest when the channels are in position. Thus by pushing the channels forward when in position upon the bed of the apparatus until their inner ends encounter and are stopped by the said back-rests $c^4$ the vertical type-conducting surfaces $c^3$ will always bear the prescribed relation to the receiving ends of the channels.

Figure 18:
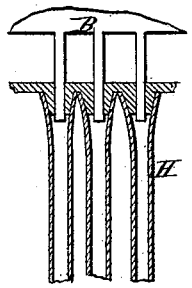

The pusher-fingers are comparatively narrow or thin, being preferably made of considerably less width than that of the smallest type to be distributed, and they enter and pass through the rear walls of the vertical type-conduits between bifurcations or continuations $c^5$ $c^5$ of the vertical type-surface $c^3$, which are thereby practically extended down to and made to connect positively with the floors of the type-containing channels H, as will be seen more clearly by reference to Figs. 15 and 16, in which channels of the maximum width are shown. Where channels of less than maximum width are employed, their side walls at the receiving ends are flared or beveled, as indicated in Figs. 17 and 18, and are formed with widened parallel side walls at that point, as shown in my application No. 201,104 for patent for type-containing channel.

Upon their front sides the stationary vertical conduit-bridges C C are preferably formed with lateral projections or toe-pieces $c^6$ $c^6$, which coincide with and project outward from the upper ends of the back-rests $c^4$ and form continuations of the upper side walls of the type-containing channels, as will be seen by reference to Figs. 2 and 3.

The intermediate or face plate, F, is formed at either extremity with the legs $f$, formed with feet which are grooved upon their under sides to pass over and engage with the upper horizontal surfaces of the parallel rails or ways D D, between which the type-containing channels H are arranged. The face-plate F has the grooves $f'$ formed in it, the curved or inclined bottoms $f^2$ of which are of different heights, corresponding in succession to the different heights at which the lower ends of the type-passages $e$ $e$ in the receivers intersect the back of the face-plate F. For instance, the lower type surfaces, 1 1, coincide in height with and form continuations of the lower ends of the type-passages $e$ in the first or lower plate, $e'$. The next highest type surfaces, 2 2, coincide in height with and form continuations of the lower ends of the type-passages $e$ in the second receiving-plate, $e^2$, and so on throughout the series.

The series of receiving-plates $e'$ $e^2$ $e^3$ $e^4$ $e^5$ (more or less in number, as desired) are mounted upon a carriage, E, similar to that described in the application for patent last named, except that they rest directly upon the cross pieces or webs $e^6$ and upon each other, their forward lower ends being sustained by the vertical shoulders E' E', while they are held against longitudinal movement by the end walls or flanges, E² E², at opposite ends of the carriage. The under sides of the standards E³ of the carriage E are grooved to fit and clasp the longitudinal rails D D, as heretofore. The cover or shield plate G is also furnished with legs or standards $g\ g$, the feet of which are grooved to engage with the longitudinal rails D D.

The ribs $d'\ d^2\ d^3\ d^4\ d^5$, formed upon the inner side of the shield G, coincide with and are opposed to the type-surfaces 1 2 3 4 5 in the intermediate plate, F, being curved convexly, so as to form with the latter and the side walls of the grooves in the said intermediate plate, F, a series of curved wide-mouthed passages, which extend downward from the lower ends of the type-grooves in the type-receiving plates and gradually converge into coincidence with the vertical type-passages in the vertical conduit-plates C C, as will be understood by reference to Figs. 3, 4, and 5. The shield-plate G is preferably provided with a handle, $g'$, for convenience of manipulation, and the cross-bar $E^5$ upon the rear of the carriage E may be used for a similar purpose.

What I claim as my invention, and desire to secure by Letters Patent, is—

1. In a type-distributing apparatus substantially such as designated, the combination, with a series of type-receiving plates mounted upon a movable bearing or carriage, and with a stationary vertical conduit-plate, of an intermediate face or type-conducting plate, substantially such as described, mounted independently and movable upon longitudinal ways, substantially in the manner and for the purpose described.

2. In a type-distributing apparatus substantially such as described, the combination, with the series of type-receiving plates mounted upon a movable support or carriage and with the independently-mounted movable intermediate face-plate and the stationary vertical conduit-plate, of the independently-mounted movable shield or cover plate arranged and operating substantially in the manner and for the purpose described.

3. In a type-distributing apparatus substantially such as described, the combination, with the series of type-receiving plates, the intermediate or face plate, and the stationary vertical conduit-plate, of an independent horizontally-movable cover or shield plate for the said face-plate, formed with ribs having concave type-guiding surfaces which are opposed to the convex type-surfaces in the said face-plate when the plates are brought together, the respectively opposed curves being such that a comparatively wide-mouthed type-passage is formed which gradually converges into the vertical type-passages in the stationary conduit-plate underneath, substantially in the manner and for the purpose described.

4. In a type-distributing apparatus substantially such as described, the combination and arrangement, with a stationary type-conduit plate, substantially such as herein set forth, of the receiver-plates mounted upon a movable carriage, the independently-movable face-plate, and the independently-movable cover or shield plate, said movable parts being mounted upon stationary parallel rails or ways upon the apparatus, substantially in the manner and for the purpose described.

5. In a type-distributing apparatus substantially such as described, the combination, with suitable type-receiving channels and with a reciprocating type-forwarder, substantially such as described, of a conduit-plate for depositing the types into the said containing-channels, which is adjustable with relation to the position and stroke of the said type-forwarder, for the purpose and substantially in the manner described.

6. In a type-distributing apparatus substantially such as described, the combination, with a series of type-containing channels, of a type-conduit plate formed with type-passages for delivering the types into the receiving ends of the said channels and with type-guiding surfaces which extend upon either side of the pusher-fingers and form continuations of the type-conduits down to the bottom or floor of the channel, for the purpose and substantially in the manner described.

7. In a type-distributing apparatus substantially such as described, the combination, with a double reciprocating comb-pusher or type-forwarder, substantially such as shown, and with two sets of type-containing channels, of the two vertical type conduits for delivering the type into the receiving ends of the type-containing channels, together with means, substantially such as described, for adjusting the said vertical type-conduits individually and independently with relation to the position and stroke of the said type-forwarding mechanism, substantially in the manner and for the purpose described.

A. AUGUSTUS LOW.

Witnesses:
WM. GARDNER,
GEO. W. MIATT.